US011585170B2

(12) United States Patent
Olsen et al.

(10) Patent No.: US 11,585,170 B2
(45) Date of Patent: Feb. 21, 2023

(54) FLOW METER MEASUREMENT FOR DRILLING RIG

(71) Applicant: HALLIBURTON ENERGY SERVICES, INC., Houston, TX (US)

(72) Inventors: Karl Kristian Olsen, Stavanger (NO); Hans Harald Berge, Bergen (NO); Olav Kvilhaug, Stavanger (NO)

(73) Assignee: Halliburton Energy Services, Inc., Houston, TX (US)

( * ) Notice: Subject to any disclaimer, the term of this patent is extended or adjusted under 35 U.S.C. 154(b) by 96 days.

(21) Appl. No.: 17/005,547

(22) Filed: Aug. 28, 2020

(65) Prior Publication Data
US 2021/0293103 A1 Sep. 23, 2021

Related U.S. Application Data

(60) Provisional application No. 62/992,019, filed on Mar. 19, 2020.

(51) Int. Cl.
| | | |
|---|---|---|
| *E21B 21/08* | (2006.01) | |
| *E21B 47/09* | (2012.01) | |
| *E21B 47/001* | (2012.01) | |
| *E21B 47/04* | (2012.01) | |
| *G01F 1/7082* | (2022.01) | |

(Continued)

(52) U.S. Cl.
CPC ............ *E21B 21/08* (2013.01); *E21B 47/001* (2020.05); *E21B 47/04* (2013.01); *E21B 47/09* (2013.01); *G01F 1/7082* (2013.01); *G01F 1/66* (2013.01); *G01F 1/712* (2013.01)

(58) Field of Classification Search
CPC ........ E21B 21/08; E21B 47/001; E21B 47/04; E21B 47/09; G01F 1/66; G01F 1/708; G01F 1/7082; G01F 1/712
See application file for complete search history.

(56) References Cited

U.S. PATENT DOCUMENTS

| | | | | |
|---|---|---|---|---|
| 5,063,776 A | * | 11/1991 | Zanker | ............... G01F 1/002 |
| | | | | 73/152.21 |
| 10,267,663 B2 | * | 4/2019 | Skelding | ............ E21B 21/01 |

(Continued)

FOREIGN PATENT DOCUMENTS

EP 3312378 A1 * 4/2018 ............ E21B 45/00

OTHER PUBLICATIONS

Application No. PCT/US2020/048345, International Search Report and Written Opinion, dated Dec. 11, 2020, 10 pages.

(Continued)

*Primary Examiner* — Blake Michener
*Assistant Examiner* — Yanick A Akaragwe
(74) *Attorney, Agent, or Firm* — Kilpatrick Townsend & Stockton LLP (57) ABSTRACT

A system is disclosed for measuring fluid flow. The system may include a plurality of sensors and a computing device. The plurality of sensors may be positionable at different angles in a container of an offshore drilling rig to sense data about drilling fluid flow in the container. The computing device may be communicatively couplable to the plurality of sensors for receiving the data about the drilling fluid flow in the container and using the data to determine a calculated fluid flow rate compensating for movement of the offshore drilling rig.

17 Claims, 8 Drawing Sheets

(51) Int. Cl.
  *G01F 1/66* (2022.01)
  *G01F 1/712* (2006.01)

(56) References Cited

U.S. PATENT DOCUMENTS

| | | | |
|---|---|---|---|
| 2008/0163692 A1* | 7/2008 | Huang | G01F 1/663 |
| | | | 73/627 |
| 2015/0218931 A1 | 8/2015 | Skinner | |
| 2016/0146653 A1 | 5/2016 | Skelding | |
| 2016/0348452 A1 | 12/2016 | Reitsma et al. | |
| 2018/0038179 A1* | 2/2018 | Canty | G06T 7/248 |
| 2018/0135366 A1* | 5/2018 | Olsen | E21B 44/00 |
| 2019/0309589 A1* | 10/2019 | Torjussen | E21B 21/08 |

OTHER PUBLICATIONS

Halliburton, "Drill Fact Real-Time Monitoring Service", 2018, 2 pages.
Halliburton, "InSite Rig Information System Helps Improve Decision-Making, Reduce Non-Productive Time and Deliver Better Wells", 2009, 2 pages.
Halliburton, "Real-Time Control Edge", 2020, 4 pages.

* cited by examiner

FLOW METER MEASUREMENT FOR DRILLING RIG

CROSS-REFERENCE TO RELATED APPLICATION

This claims the benefit to U.S. Provisional Application No. 62/992,019 filed on Mar. 19, 2020, titled "Flow Meter Measurement for Drilling Rig," the disclosure of which is hereby incorporated by reference in its entirety for all purposes.

TECHNICAL FIELD

The present disclosure relates generally to offshore drilling. More specifically, but not by way of limitation, this disclosure relates to monitoring fluid flow for an offshore drilling rig.

BACKGROUND

Offshore drilling rigs may be used to extract hydrocarbon product from a subsea environment. An offshore drilling rig may use risers, such as conduits used for fluid transportation, to transport produced hydrocarbon product from the subsea environment to the rig or to transport production fluid downhole. It may be desirable for operators of the rig to know how much fluid is flowing for various reasons, such as tracking production, monitoring downhole concerns, etc. Sensors may be implemented within the risers to measure fluid flow. Available sensing technology for measuring fluid flow in offshore drilling applications may fall short in accuracy and cost-effectiveness.

DETAILED DESCRIPTION

Certain aspects and examples of the present disclosure relate to using data from sensors, along with data processing, to compensate for changes in fluid flow by drilling rig motion that may be experienced by a drilling rig in an offshore location. Two or more sensors can be positioned at different angles to detect data about fluid flow in a container, which may be a partially closed container or a full or half pipe, on the drilling rig. The data can be processed to determine changes from rig motion, such as pitch and roll, in a hydrostatic head on a flow line of the drilling rig. Examples of data processing techniques can include pattern recognition, cross-correlation, and machine-learning processes.

Offshore drilling can involve risers to provide a way for returning back to the surface drilling fluid, and any additional solids or fluids, from a borehole being drilled. Riser sections are sturdily built to withstand significant loads imposed by weights carried by the riser sections and to withstand environmental loads when in operation. Returning drilling fluid is measured for a variety of purposes, including to determine whether and how much to compensate for drilling fluid lost during the drilling operation. Risers may be subject to tilt or other movements that may impact, at any given time, returning drilling fluid measurement. To measure flow accurately, currently available flow meters are costly and involve modification to a flow line of a rig (e.g., Coriolis flow meters that involve a full pipe or bypass loop modifications) to achieve highly accurate flow readings. In some examples, a more accurate drilling fluid return flow reading can be achieved in drilling operations using data from sensors and data processing techniques.

For example, return flow can be monitored using two or more sensors positioned at different angles in a flow line during a drilling operation. Flow meter signals can be received by a processing device from the sensors and the signals may be combined. Pattern recognition, cross-correlation calculations, filtering, signal processing, and machine learning can be applied in some examples to determine better flow measurements. Data may be available as microservices. Heave, pitch, and roll compensation can be determined from placement of the sensors and from enhanced data processing techniques.

In some examples, motion correction can be addressed by direct correlation between motion and flow, momentum balance with continuity, data-based models, or physics-based models. Direct correlation between motion and flow can involve low-pass filtering. Momentum balance with continuity can involve information about rig components and can be adjustable to fluid type. A data-based model or a physics-based model can be trained using historical data that may involve data over a time period of at least one second but may not use information about rig components or fluid.

For example, various equations can be used for inclined pipes or other containers. Mass balance can be represented by the following equation:

$$\frac{\partial A}{\partial t} = -\frac{\partial Q}{\partial x} \quad \text{(Equation 1)}$$

where A is an available flow area based on a liquid level in square meters ($m^2$) and Q is a flow rate in cubic meters per second $$\left(\frac{m^3}{s}\right).$$

momentum balance can be represented by the following equation:

$$\frac{\partial Q}{\partial t} = -\frac{\partial(UQ)}{\partial x} - \frac{d(\overline{P}A)}{dx}\frac{1}{\rho} + g\sin\alpha A + \frac{\overline{\tau}}{\rho}$$ (Equation 2)

where U is an average velocity in meters per second $$\left(\frac{m}{s}\right),$$

t is time in seconds, s, x is a distance in meters m, $\overline{P}$ is a flow hydrostatic pressure in Newtons per square meter $$\left(\frac{N}{m^2}\right),$$

ρ is density in kilograms per cubic meter $$\left(\frac{kg}{m^3}\right),$$

g is gravitational acceleration in meters per second squared $$\left(\frac{m}{s^2}\right),$$

α is angle of inclination in Radians, τ is shear stress based on non-Newtonian correlation in Newtons per square meter $$\left(\frac{N}{m^2}\right),$$

and P is wetted perimeter in meters m.

Flow from the annular pipe can serve as a boundary condition, such as an input signal, and the equations can be used to evaluate the output signal at the end of the pipe where the sensors are positioned. The following equations can be used for an annular pipe:

$$A_{ann}\frac{\partial h}{\partial t} = \left(Q_{ann} - \left(Q_{inc} + A\sqrt{2g(h-h_i)}\right)\right)$$ (Equation 3)

and $$\tau = K\left(\frac{\partial u}{\partial y}\right)^n$$ (Equation 4)

where ann denotes an annular region, inc denotes an inclined pipe, h is a fluid level, $h_i$ is a fluid level in the annular region, K is the flow consistency index, ∂u/∂y is the shear or the velocity gradient perpendicular to the plane of shear, and n is the flow behavior index.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
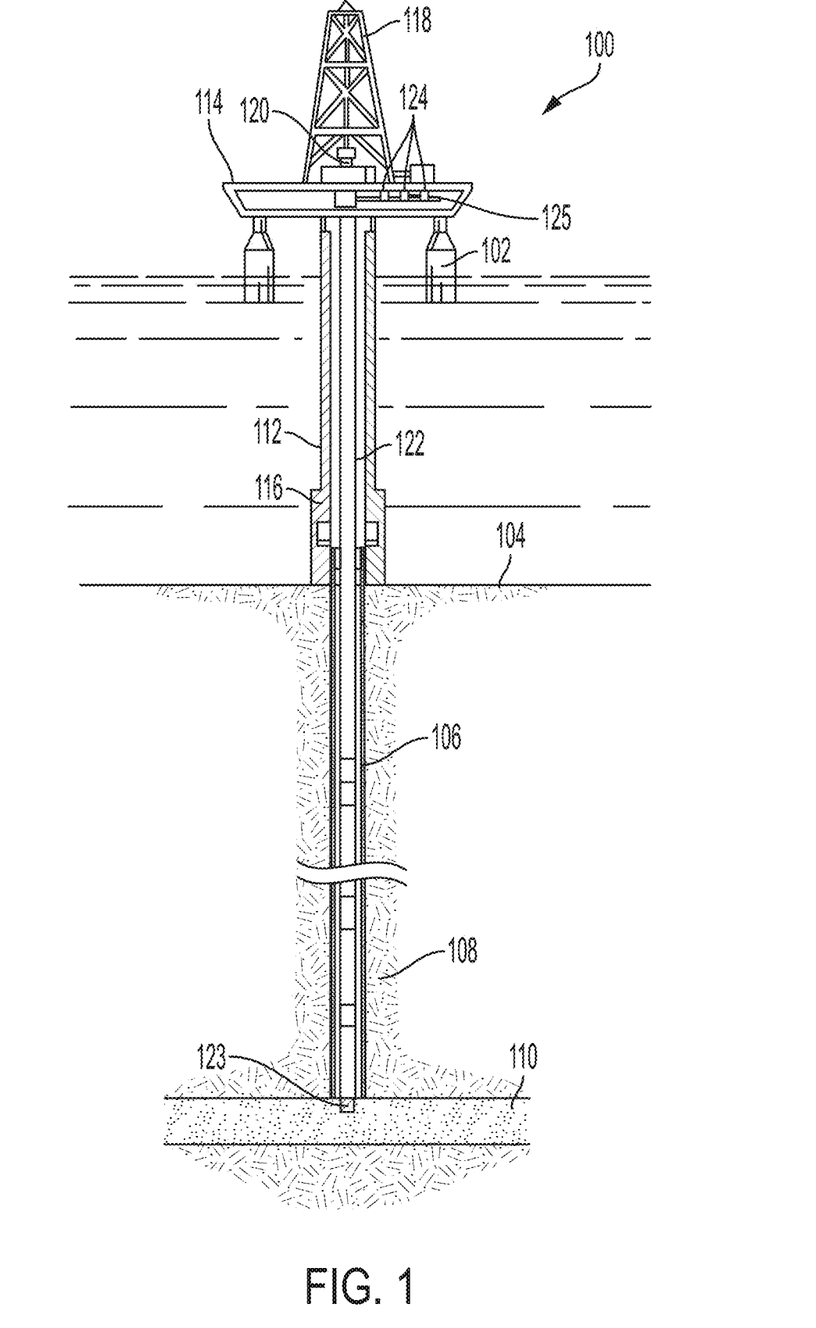
FIG. 1 is a sectional, schematic view of an example of an offshore wellbore drilling environment including a set of sensors operating as a flow meter for determining a calculated fluid flow rate, according to at least one example of the present disclosure.

FIG. 1 is a sectional, schematic view of an example of an offshore wellbore drilling environment 100 including a set of sensors 124 operating as a flow meter for determining calculated fluid flow rates, according to at least one example of the present disclosure. A floating workstation 102, such as an oil platform or an offshore platform, can be centered over a submerged oil or gas well located in a sea floor 104 having a wellbore 106. The wellbore 106 may extend from the sea floor 104 through a subterranean formation 108. The subterranean formation 108 can include a fluid-bearing formation 110. A subsea conduit 112 can extend from the deck 114 of the floating workstation 102 into a wellhead installation 116. The floating workstation 102 can have a derrick 118 and a hoisting apparatus 120 for raising and lowering tools to drill, test, and complete the oil or gas well. The floating workstation 102 can be an oil platform as depicted in FIG. 1 or an aquatic vessel capable of performing the same or similar drilling and testing operations. In some examples, the processes described herein can be applied to a land-based environment for wellbore exploration, planning, and drilling.

A drill string 122 can be lowered into the wellbore 106 of the oil or gas well during a drilling operation of the oil or gas well. The drill string 122 can include a drill bit 123 to drill the wellbore 106 in addition to other tools positioned along the drill string that are usable for testing and drilling operations. These tools may include measuring-while-drilling ("MWD") and logging-while drilling ("LWD") tools and devices. Additionally, upon completion of the wellbore 106, other tools may also be lowered into the wellbore 106. For example, a wireline and wireline logging and formation testers may be lowered into the wellbore 106, wellbore stimulation equipment may be lowered into the wellbore 106, production tubing and equipment may be lowered into the wellbore 106, and any other tools usable during drilling, completion, and production within the wellbore 106 may also be lowered into the wellbore 106.

In some examples, a set of sensors 124 ("the sensors 124") may be positioned on a drilling fluid return flow line 125 coupled to the subsea conduit 112 or other similar container for transporting fluid from the wellbore to the floating workstation 102. The sensors 124, as depicted in FIG. 1, include three individual sensors, but may include two individual sensors or more than three individual sensors that may positioned to monitor distance from the sensors 124 to fluid within the drilling fluid return flow line 125. The sensors 124 may be positioned at unique angles in reference to the drilling fluid return flow line 125 of the subsea conduit 112 to provide better accuracy of flow rate measurements. The sensors 124 may detect a distance from the sensors 124 to the fluid, and a calculated fluid flow rate may be determined based at least in part on distance measurements. The sensors 124 may be arranged to normalize data to account for movement of the floating workstation 102 that may affect the distance measurements of the sensors 124.

Figure 2:
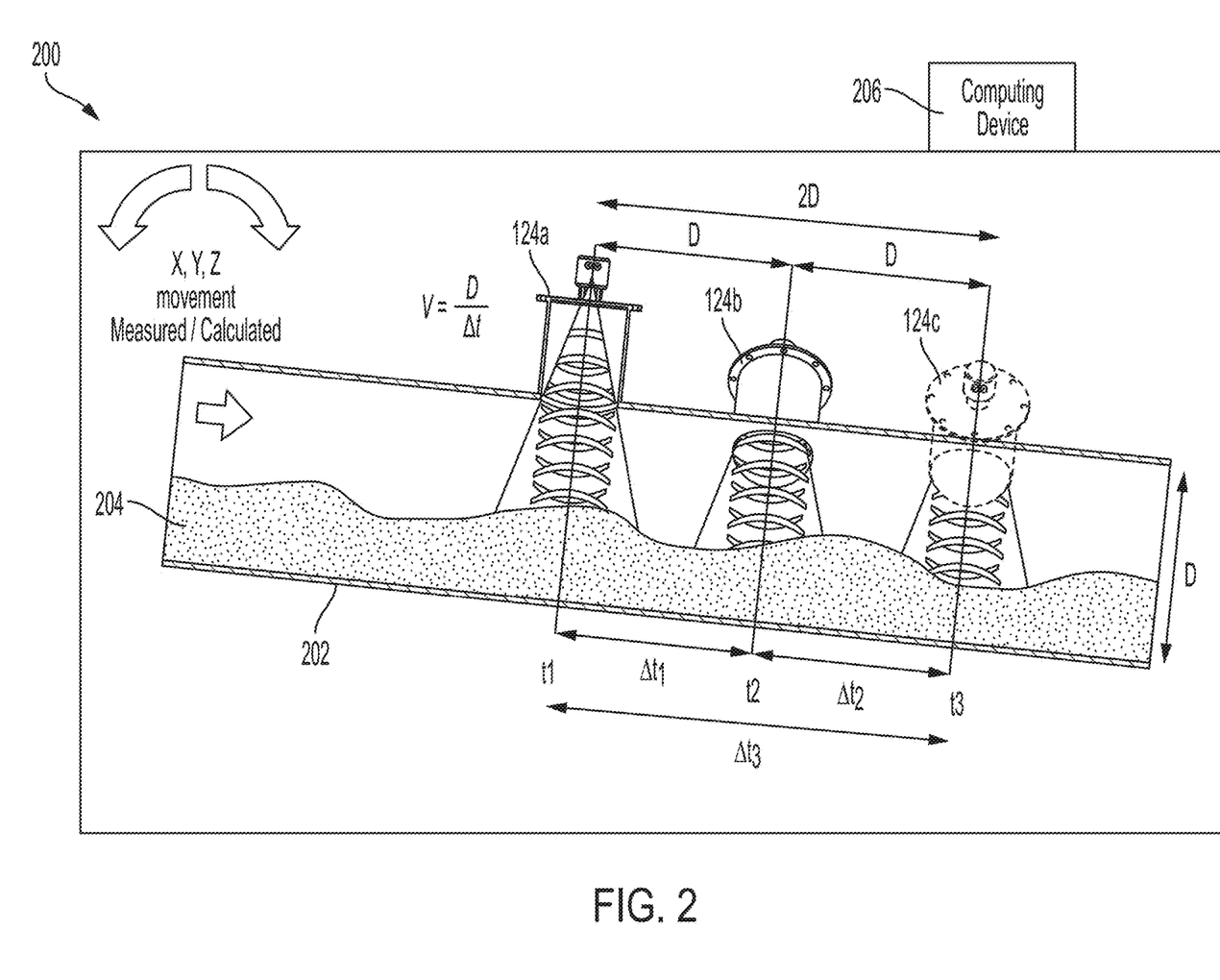
FIG. 2 is a side sectional view of a drilling fluid return flow of a flow monitoring system, according to at least one example of the present disclosure.

FIG. 2 is a side view schematic of the drilling fluid return flow line 125 of a flow monitoring system 200, according to at least one example of the present disclosure. The drilling fluid return flow line 125, as shown, includes three sensors 124a, 124b, and 124c that may be positioned a distance D apart from one another. The sensors 124a, 124b, and 124c may be distance sensors, guided rod sensors, RADAR sensors, sonic sensors, or any other suitable sensors for measuring distances. The sensors 124a, 124b, and 124c may additionally or alternatively measure a level of fluid 204 in the drilling fluid return flow line 125 and a sinusoidal representation of the fluid 204 for determining the calculated fluid flow rate of the fluid 204. In an example, the distance D may be the diameter of the drilling fluid return flow line 125. The drilling fluid return flow line 125 may also include fluid 204 that may be drilling fluid, produced hydrocarbons, or any other suitable fluid.

The sensors 124a, 124b, and 124c are depicted as being directed toward the fluid 204 at different angles with respect to one another. The sensors 124a, 124b, and 124c may be offset from one another at angles of 30 to 60 degrees, or any other configuration suitable for detecting the fluid 204 in the drilling fluid return flow line 125, and as depicted in FIG. 2, the sensors 124a, 124b, and 124c are offset from one another at angles of 45 degrees. While depicted in FIG. 2 as having three sensors, the flow monitoring system 200 in the drilling fluid return flow line 125 can include two or more sensors to detect the three-dimensional movement, noted as X, Y, Z movement, of fluid 204 due to the movement of the drilling fluid return flow line 125. The data can be communicated to a computing device 206, which can determine compensation changes that account for movement of the drilling fluid return flow line 125.

The computing device 206 can be positioned at the floating workstation 102 or remotely from the floating workstation 102. In some examples, the computing device 206 can be formed by multiple computing devices in a distributed computing framework. The computing device 206 can receive data directly or indirectly from the flow monitoring system 200 via a communication network that includes a wired network, a wireless network, or a combination of wired and wireless communication links.

The signals from the one or more sensors 124a, 124b, and 124c positioned at different angles with respect to each other can be measured at three different times t1, t2, and t3 and may be compared with a distance, noted as D in FIG. 2. By comparing the signals with the distance, the speed of the fluid 204 may be determined using cross-correlation, pattern recognition, and an equation for velocity:

$$v = \frac{D}{\Delta t} \quad \text{(Equation 5)}$$

where v is velocity, D is distance, and Δt is a change in time. Examples of cross-correlation operations can be Pearson correlation, time-lagged cross-correlation, dynamic time warping, instantaneous phase synchrony, etc. The time of a flow event between the sensors 124a, 124b, and 124c can be determined, and pattern recognition processes, including statistical deviation, can determine a best match or matches to cross-correlate the individual signals to determine the speed of the fluid 204.

Figure 3:
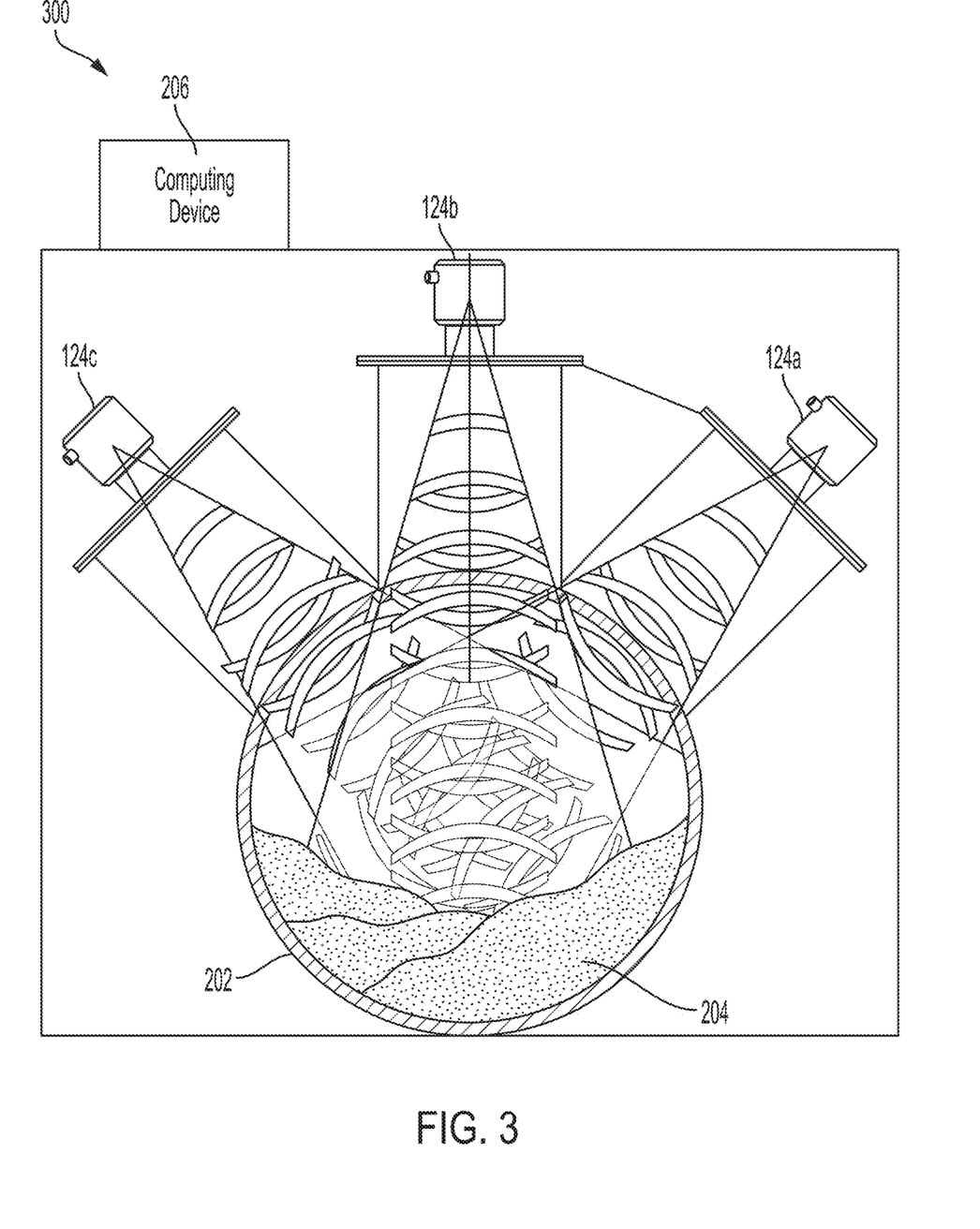
FIG. 3 is a cross-sectional front view of the flow monitoring system of FIG. 2, according to at least one example of the present disclosure.

FIG. 3 is a cross-sectional front view 300 of the flow monitoring system 200, according to at least one example of the present disclosure. The flow monitoring system 200 in this example includes the sensors 124a, 124b, and 124c coupled to a drilling fluid return flow line 125 that can include flow of fluid 204. Although the sensors 124a, 124b, and 124c are depicted, two sensors or more than three sensors can be used. The cross-sectional front view 300 shows the flow monitoring system 200 in a state that is moving with respect to a stationary state. Because the flow monitoring system 200 is in the moving state, the level of the fluid 204 may be at a lower level in some regions than the level of the fluid in the stationary state.

A calculated fluid flow can be determined for the fluid 204 using a cross-correlation operation. Cross-correlation operations that can be used to determine the calculated fluid flow may be Pearson correlation, time-lagged cross-correlation, dynamic time warping, instantaneous phase synchrony, a combination thereof, or any other suitable cross-correlation operation for determining fluid flow. The cross-correlation operation may take, as an input, position measurements from the sensors 124a, 124b, and 124c. The cross-correlation operation may determine, from the position measurements, a volume of the fluid 204 in the drilling fluid return flow line 125, and, from the volume of the fluid 204, the calculated fluid flow for the fluid 204 in the drilling fluid return flow line 125 may be determined.

In some examples, sounding tables can be embedded in each sensor 124a, 124b, and 124c, or in the computing device 206, to determine a volumetric flow of the fluid 204. The sounding tables may help determine the volumetric flow by taking, from the sensors 124a, 124b, and 124c, a measured displacement or distance measurement of the fluid 204 in the drilling fluid return flow line 125 and outputting an estimated volume of the fluid 204. The calculated fluid flow rate that may be output by the computing device can be directly calculated from the estimated volume of the fluid 204 using estimated fluid flow characteristics. A system according to some examples can automatically accommodate, calibrate, or self-adjust to subsequent operations and calculated flow ranges. Each sensor can be set at a different angle with respect to the drilling fluid return flow line 125 as compared to the other sensors to account for sloshing effects that may include roll and pitch on a three-dimensional axis.

Figure 4:
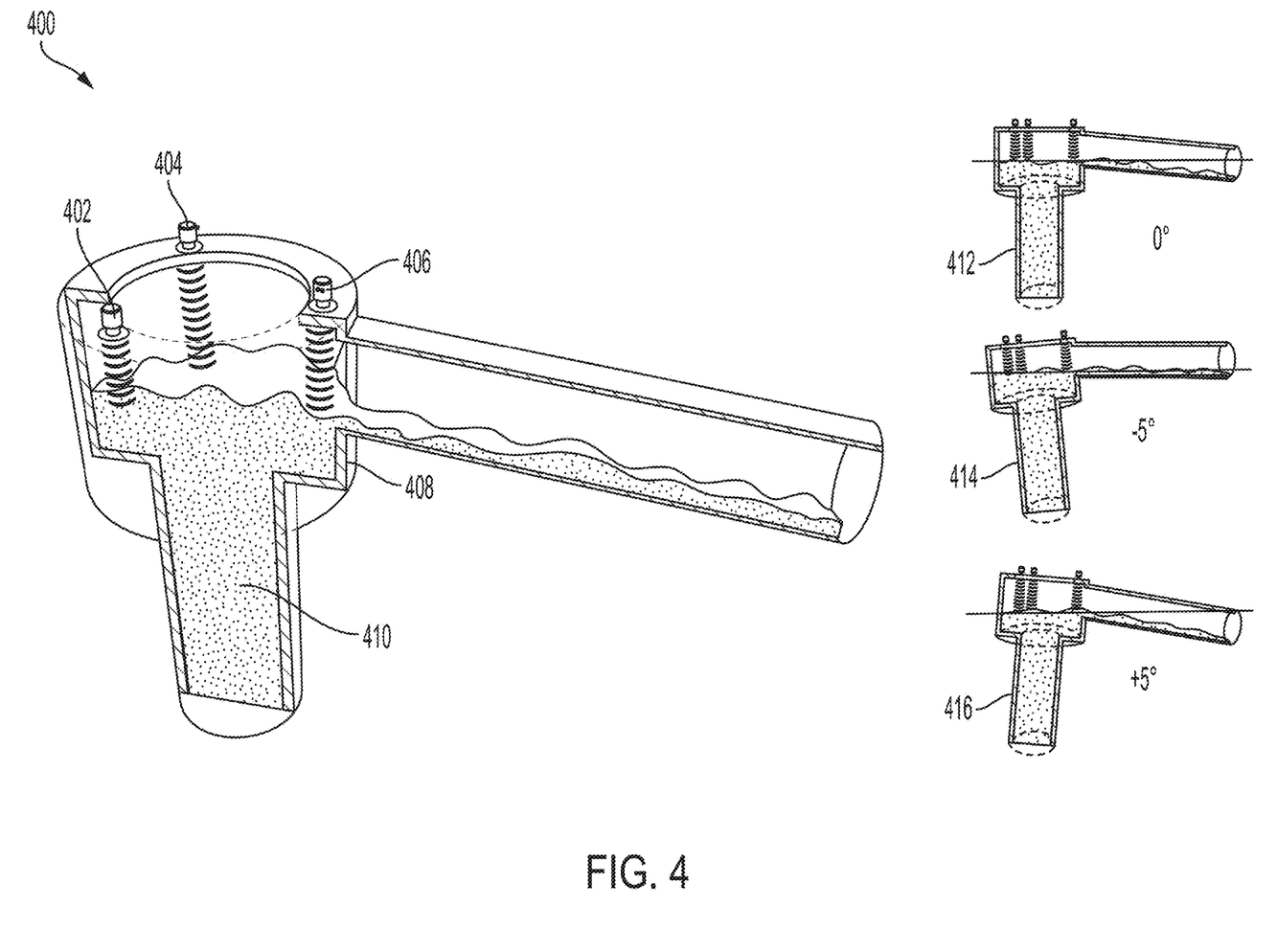
FIG. 4 is a cross-sectional view of a flow monitoring system, according to at least one example of the present disclosure.

FIG. 4 is a cross-sectional view of an additional flow monitoring system 400, according to at least one example of the present disclosure. The additional flow monitoring system 400 includes sensors 402, 404, and 406 in a partially closed container 408 for monitoring the movement of drilling fluid 410 in the container 408. Examples of the container 408 can include a diverter housing, a fluid tank, a mud pit, or a header box. Also depicted to the right in FIG. 4 are three diagrams 412, 414, and 416 that depict the change in fluid position in the container 408. Diagram 412 shows a change of 0° in pitch of the container 408 with respect to an expected position. Diagram 414 shows a change of −5° in pitch of the container 408 with respect to the expected position. Diagram 416 shows a change of +5° in pitch of the container 408 with respect to the expected position. The sensors 402, 404, and 406 may detect the change of pitch in the additional flow monitoring system 400, and the sensors 402, 404, and 406 may transmit a measured change of pitch to the computing device 206. While the change of pitch is depicted in FIG. 4 as being −5°, 0°, and +5°, the change of pitch may be any suitable degree measurement representing movement of the floating workstation 102. The computing device 206 can receive the measured change of pitch and may output a calculated fluid flow rate that compensates for the measured change in pitch. Although the three sensors 402, 404, and 406 are depicted, in other examples two sensors or more than three sensors can be used.

In this example, the additional flow monitoring system 400 can be used as a motion reference unit based on level measurement sensors by analyzing the movement of drilling fluid 410 in the partially closed container 408. Data from the sensors 402, 404, and 406 can be combined and sounding tables may be used to identify fluid motion and may be coupled with data analysis to identify dynamic states of a moving vessel.

Alternatively or additionally, flow changes due to vessel movement can be predicted by the computing device 206. The computing device 206 may execute data processing techniques on data from the sensors 402, 404, and 406 by applying algorithms to identify states and changes in the partially closed or closed system. In some examples, the computing device 206 may quantify the effect by tying the states back to flow events or responses at further points along the flow line. This can be used to compensate the flow out readings for vessel movement.

In some examples, the sensors 124a, 124b, 124c, 402, 404, and 406 may be used in combination. This combination may increase accuracy of the calculated fluid flow output by the computing device 206. The combination of the sensors 124a, 124b, 124c, 402, 404, and 406 may determine the calculated fluid flow for the fluid 204 in the drilling fluid return flow line 125 to a greater accuracy as compared to using just the sensors 124a, 124b, and 124c, or just the sensors 402, 404, and 406. The computing device 206, by using the combination of the sensors 124a, 124b, 124c, 402, 404, and 406, may be able to output a calculated fluid flow that compensates for movement sustained by the floating workstation 102.

Figure 5:
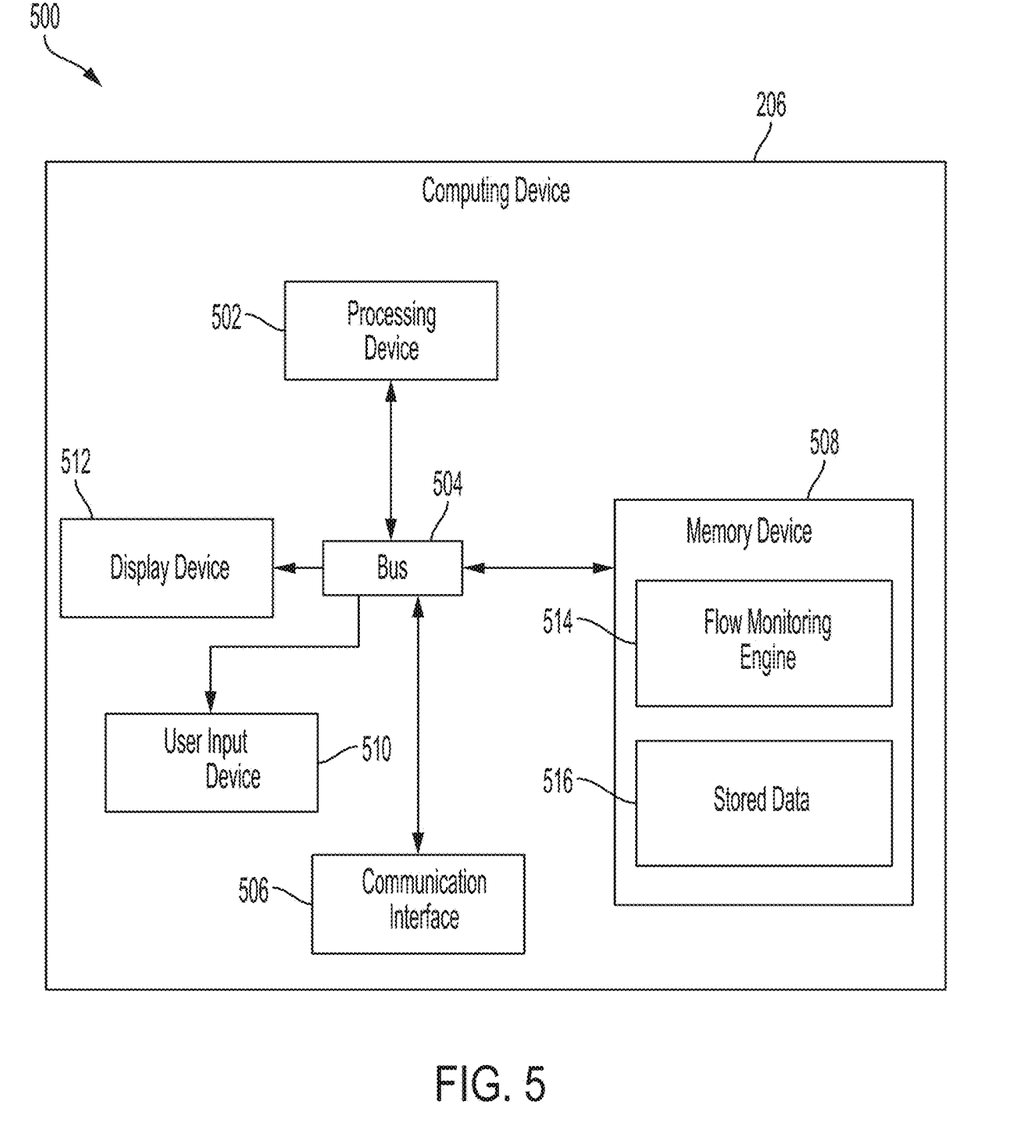
FIG. 5 is a block diagram of a computing device for monitoring drilling fluid flow using data from sensors in an offshore drilling operation, according to at least one example of the present disclosure.

FIG. 5 is a block diagram of the computing device 206 for monitoring drilling fluid flow using data from sensors 124a, 124b, and 124c in an offshore drilling operation, according to at least one example of the present disclosure. The computing device 206 can include a processing device 502, a bus 504, a communication interface 506, a memory device 508, a user input device 510, and a display device 512. In some examples, the components shown in FIG. 5 can be integrated into a single structure. For example, the components can be within a single housing with a single processing device. In other examples, the components shown in FIG. 5 can be distributed (e.g., in separate housings) and in electrical communication with each other using various processors. It is also possible for the components to be distributed in a cloud computing system or grid computing system.

The processing device 502 can execute one or more operations for receiving information from sensors and executing processes for analyzing the information to monitor drilling fluid flow in a drilling operation. The processing device 502 can execute instructions stored in the memory device 508 to perform the operations. The processing device 502 can include one processing device or multiple processing devices. Non-limiting examples of the processing device 502 include a field-programmable gate array ("FPGA"), an application-specific integrated circuit ("ASIC"), a processor, a microprocessor, etc.

The processing device 502 may be communicatively coupled to the memory device 508 via the bus 504. The memory device 508 may include any type of memory device that retains stored information when powered off. Non-limiting examples of the memory device 508 include electrically erasable and programmable read-only memory ("EEPROM"), flash memory, or any other type of non-volatile memory. In some examples, at least some of the memory device 508 can include a non-transitory medium from which the processing device 502 can read instructions. A computer-readable medium can include electronic, optical, magnetic, or other storage devices capable of providing the processing device 502 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

The communication interface 506 can represent one or more components that facilitate a network connection or otherwise facilitate communication between electronic devices. Examples include, but are not limited to, wired interfaces such as Ethernet, USB, IEEE 1394, or wireless interfaces such as IEEE 802.11, Bluetooth™, near-field communication (NFC) interfaces, RFID interfaces, or radio interfaces for accessing cellular telephone networks (e.g., transceiver/antenna for accessing a CDMA, GSM, UMTS, or other mobile communications network). In some examples, the computing device 206 includes a user input device 510. The user input device 510 can represent one or more components used to input data. Examples of the user input device 510 can include a keyboard, mouse, touchpad, button, or touch-screen display, etc. In some examples, the computing device 206 includes a display device 512. The display device 512 can represent one or more components used to output data. Examples of the display device 512 can include a liquid-crystal display (LCD), a computer monitor, a touch-screen display, etc. In some examples, the user input device 510 and the display device 512 can be a single device, such as a touch-screen display.

In some examples, the memory device 508 can include instructions and data, such as a flow monitoring engine 514 and stored data 516. The flow monitoring engine 514 can be computer program code instructions that are executable by the processing device 502 for executing cross-correlation or other processes on data received from sensors via the communication interface 506 to monitor drilling fluid flow. Based on the analysis, the flow monitoring engine 514 may be executed by the processing device 502 for outputting alarms, data, or commands for controlling or operating an offshore drilling operation. The stored data 516 may include received sensor data about returned drilling fluid and results from executing processes by the flow monitoring engine 514.

Figure 6:
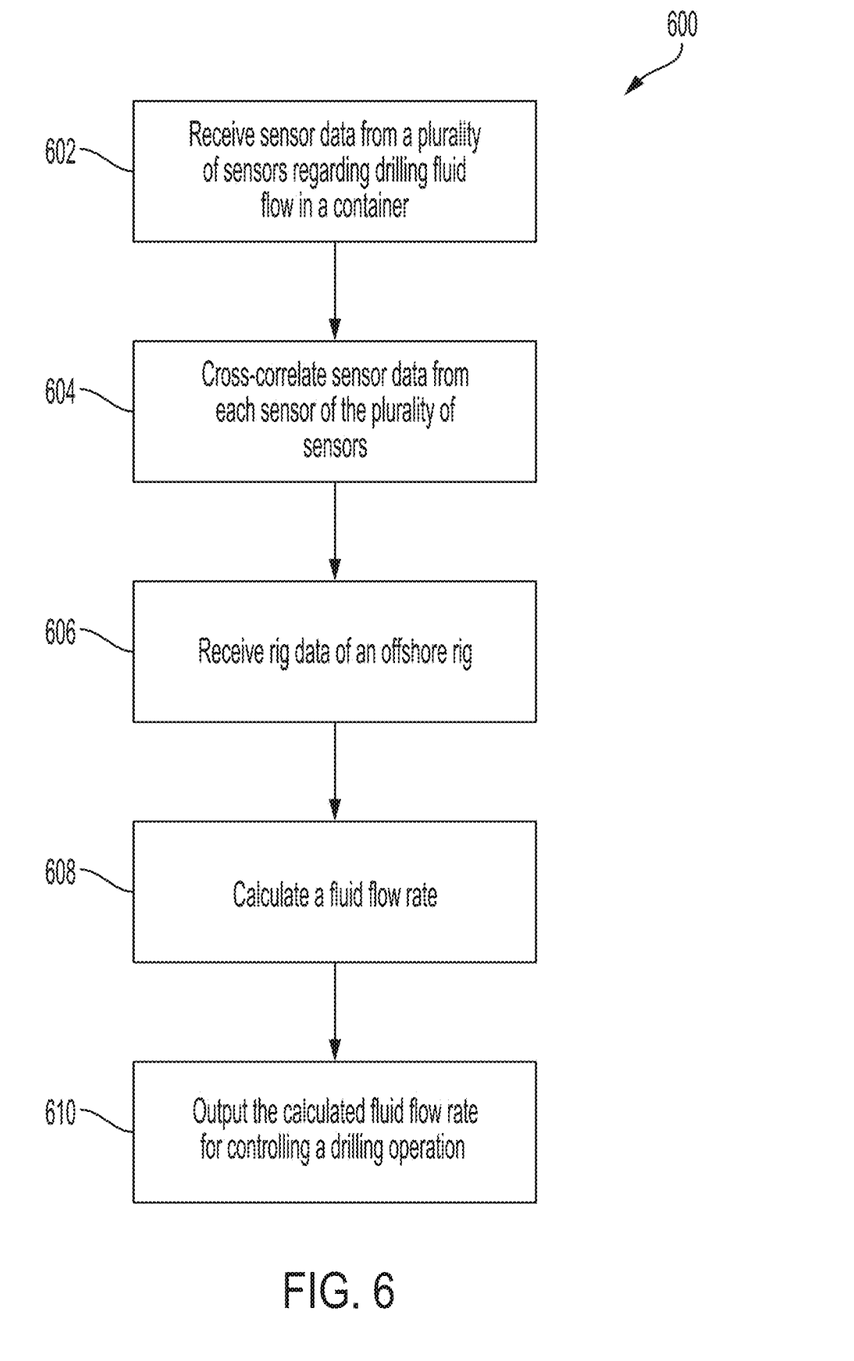
FIG. 6 is a flowchart of a process for determining a calculated fluid flow rate in a container, according to at least one example of the present disclosure.

FIG. 6 is a flowchart of a process 600 for determining calculated fluid flow rate in a container, according to at least one example of the present disclosure. At block 602, the process 600 involves receiving sensor data from the sensors 124 relating to drilling fluid flow in a container, such as the drilling fluid return flow line 125. The container may also be any other suitable container for transporting fluid 204 during a drilling operation. The sensors 124 may be distance sensors or any other suitable sensors for measuring fluid flow in the container. The sensors 124 may be positioned at different angles in reference to the container and may sense fluid flow data relating to an offshore drilling rig such as the floating workstation 102. The sensors 124 may be continuously or periodically calibrated to ensure that each sensor of the sensors 124 provides accurate measurements for a subsequent flow operation.

At block 604, the process 600 involves cross-correlating sensor data from each sensor of the sensors 124 with sensor data from at least one other sensor of the sensors 124. This cross-correlation operation may yield a cross-correlated dataset and may be done remotely. The cross-correlated dataset may include data relating to fluid flow such as velocity of the fluid 204 within the container.

At block 606, the process 600 involves receiving rig data from an offshore rig such as the floating workstation 102. The rig data may be associated with the container, and the rig data may include data such as flow-in volume, bit depth, hole depth, stand pipe pressure, hookload, riser tension, riser movement, or riser weight. The rig data may be combined with the sensor data received at block 602 and may be used to make calculations for the drilling operation.

At block 608, the process 600 involves determining a calculated fluid flow rate. The calculated fluid flow rate may be determined by the computing device 206 using a combination of the cross-correlated dataset and the rig data that may include distance or position measurements of the fluid 204. The calculated fluid flow rate may be normalized to account for an effect of movement of an offshore drilling rig during the drilling operation.

At block 610, the process 600 involves outputting the calculated fluid flow rate for controlling a drilling operation. The computing device 206, or an operator of the drilling operation, may compare the calculated fluid flow rate to an expected fluid flow rate. If the calculated fluid flow rate and the expected fluid flow rate are not the within a threshold margin of one another, such as +/−10%, the computing device 206, or the operator of the drilling operation, may update drilling parameters of the drilling operation. If the calculated fluid flow and the expected fluid flow are within the threshold margin, the computing device 206, or the operator of the drilling operation, may maintain the current drilling parameters for the drilling operation.

Figure 7A:
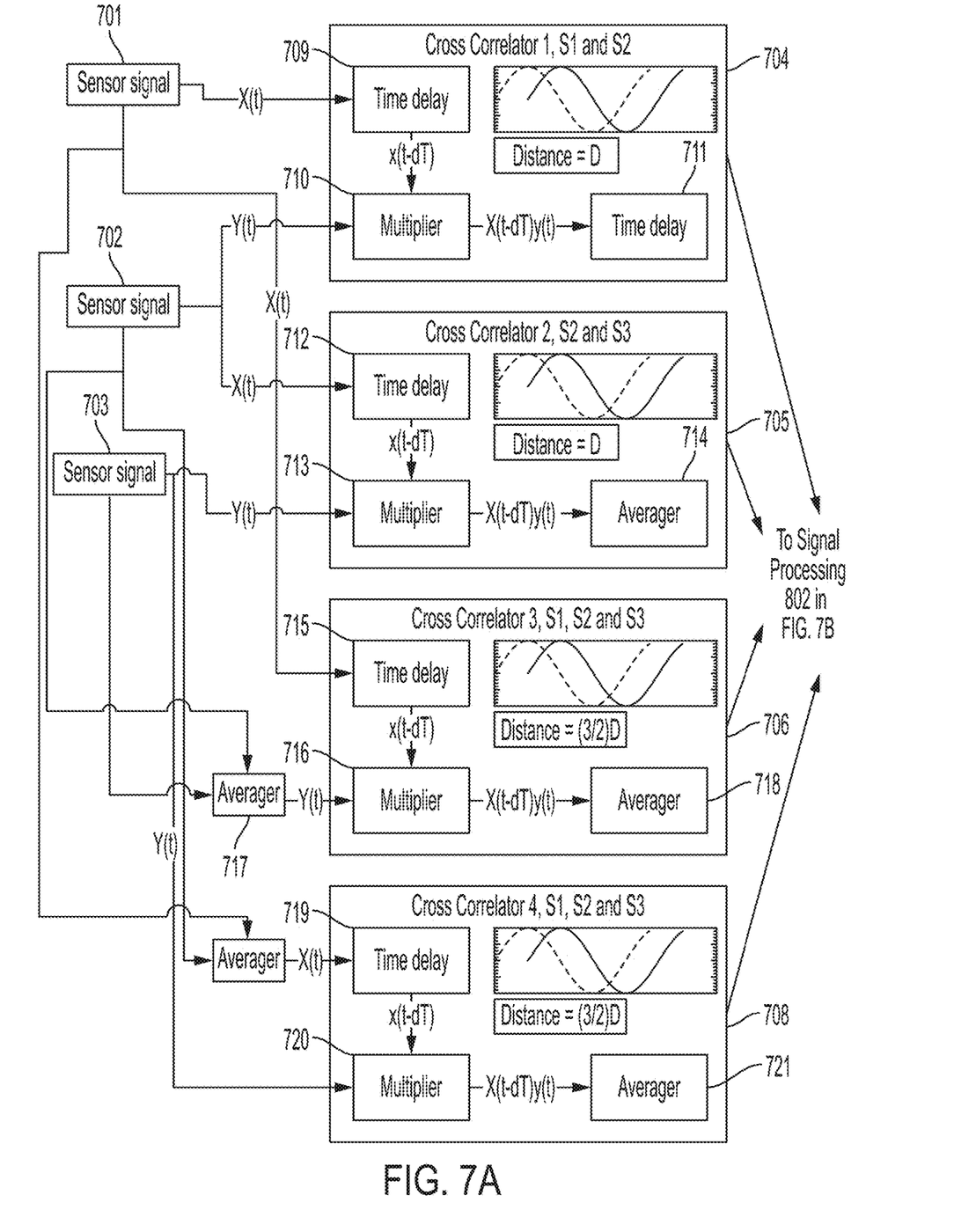
FIGS. 7A and 7B together depict a process flow diagram of signal processing processes that a computing device can implement, according to at least one example of the present disclosure.
Figure 7B:
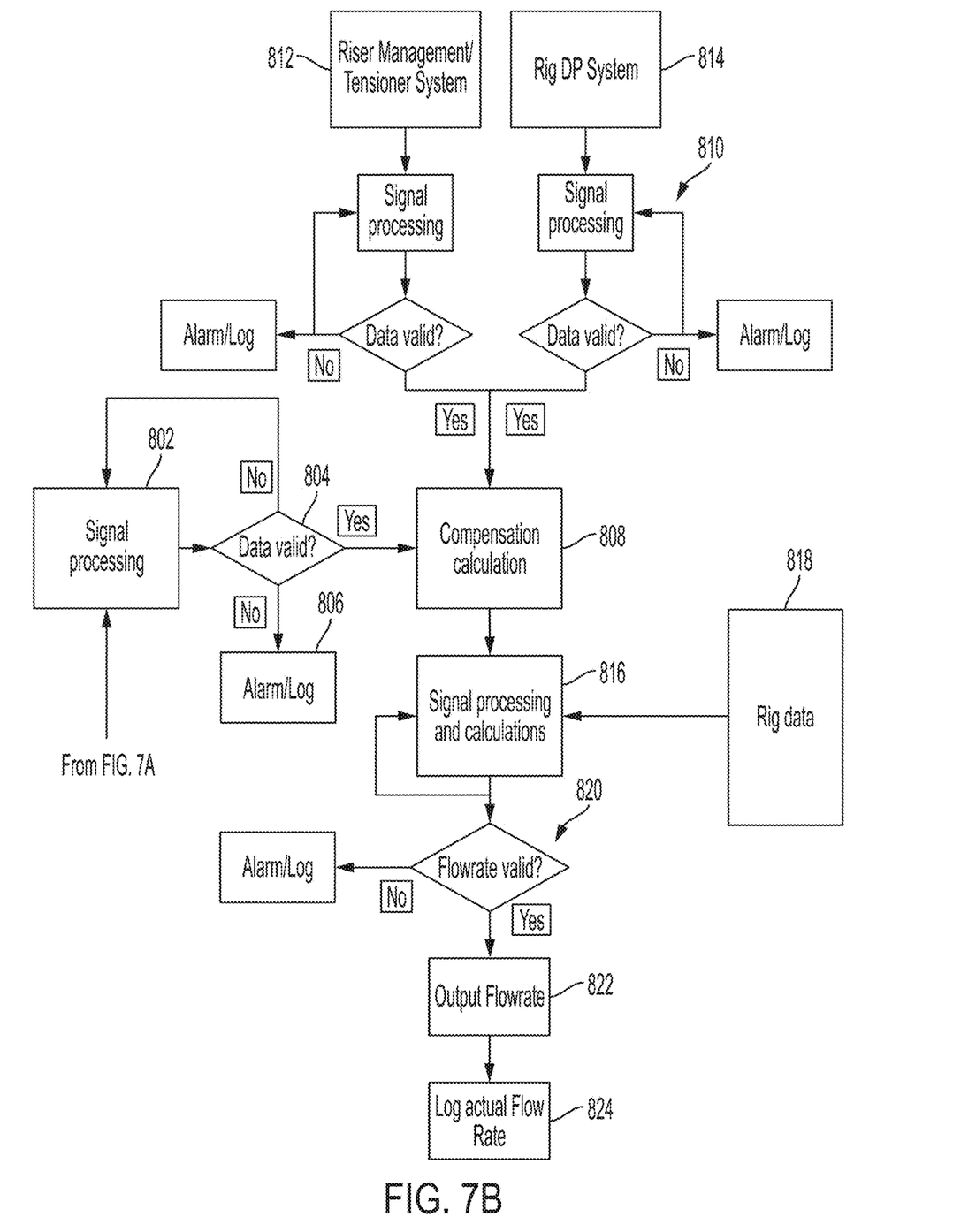

FIGS. 7A and 7B together depict a process flow diagram of signal processing processes that the computing device 206 can implement by executing the flow monitoring engine 514, according to at least one example of the present disclosure. At least some of the signal processing may additionally or alternatively be performed at the sensors or any other suitable field instrumentation. Starting from the left side in FIG. 7A, three data signals (sensor signal 701, sensor signal 702, and sensor signal 703) from the sensors 124 in the flow monitoring system 200 on an offshore drilling rig, such as the floating workstation 102, are received and provided to cross correlators 704, 705, 706, and 708. In other examples, fewer or more sensor signals and cross correlators can be used. Each cross correlator 704, 705, 706, and 708 may implement Pearson correlation, time-lagged cross-correlation, dynamic time warping, instantaneous phase synchrony, a combination thereof, or other processes.

The cross correlator 704 can receive the signal 701 into a time delay 709, and the time delayed signal 701 can be provided to a multiplier 710 in the cross correlator 704. Also received in the multiplier 710 is the signal 702 that is not time delayed. The output of the multiplier 710 may be provided to another time delay 711 and the multiplied, time-delayed signal can be output to signal processing 802 in FIG. 7B.

The cross correlator 705 can receive the signal 702 into a time delay 712, and the time delayed signal 702 can be provided to a multiplier 713 in the cross correlator 705. Also received in the multiplier 713 is the signal 703 that is not time delayed. The output of the multiplier 713 is provided to an averager 714 in the cross correlator 706, and the multiplied, averaged signal from the cross correlator 705 can be output to the signal processing 802 in FIG. 7B.

The cross correlator 706 can receive the signal 701 into a time delay 715 in the cross correlator 706 and the time delayed signal 701 can be provided to a multiplier 716 in the cross correlator 706. Also received in the multiplier 716 is an average of the signal 702 and the signal 703 from an averager 717, which is not time delayed. The output of the multiplier 716 is provided to an averager 718 in the cross correlator 706, and the multiplied, averaged signal from the cross correlator 706 can be output to the signal processing 802 in FIG. 7B.

The cross correlator 708 can receive an average of the signal 701 and the signal 702 into a time delay 719 in the cross correlator 708, and the time delayed signal can be provided to a multiplier 720 in the cross correlator 708. Also received in the multiplier 720 is the signal 703 that is not time delayed. The output of the multiplier 720 is provided to an averager 721 in the cross correlator 708, and the multiplied, averaged signal from the cross correlator 708 can be output to the signal processing 802 in FIG. 7B.

The signal processing 802 in FIG. 7B can receive the outputs of the cross correlators 704, 705, 706, and 708 that may be considered cross-correlated data. In some examples, the cross-correlated data may be used by the signal processing 802, in combination with riser management information, rig dynamic positioning information, and rig data, to determine the calculated fluid flow rate.

The signal processing 802 can implement various regulator principles such as low band filtering, high band filtering, model predictive control (MPC), Kalman filtering, Fourier transform processing, etc. For example, the signal processing 802 can determine which medium speed and other calculations are most likely to be correct based on certain predefined criteria or based on results from machine learning or neural network model outputs. The results can be compared to a digital twin model, a hydraulic model, or an equivalent model for determining the calculated theoretical flow output from the well.

In some examples, the cross correlators 704, 705, 706, and 708 can calculate the theoretical flow rate or speed based on sensor readings. Each of the cross correlators 704, 705, 706, and 708 can have its own rate based on different sensor configurations, mathematically. Outputs of the cross correlators 704, 705, 706, and 708 can be received by the signal processing 802. The outputs from the cross correlators 704, 705, 706, and 708 can be vetted by a sensor voting principle as the signal processing 802 views the cross correlators 704, 705, 706, and 708 as sensors. The signal processing 802 can also use independent models from third parties or internal models (not shown between the cross correlators 704, 705, 706, 708, and the signal processing 802) to indicate a correct flow rate or speed.

The data from the signal processing 802 can be assessed at block 804 to determine whether the data is valid. If the data is not valid, an alarm is output, an instance is logged in block 806, and the process returns to the signal processing 802. If the data is valid at block 804, the data is provided to compensation calculation block 808. Data can be determined to be invalid if the data is null, undefined, or represent extreme changes outside of predefined boundaries that can be set by a model or received from manual inputs.

The compensation calculation block 808 may receive information after similar signal processing and data validity checks 810. The information can include first information 812 and second information 814. The first information 812 may include riser management or tensioner system information, such as tension, movement, and weight of the riser. The second information 814 may include rig dynamic positioning system information such as heave, roll, pitch, and riser disconnect. If a rig is not a floating rig, such as the floating workstation 102, then the compensation calculation block 808 may not receive the first information 812 or the second information 814, and data from block 804 can pass through the compensation calculation block 808.

In some examples, the compensation calculation block 808 can add or subtract additional flow based on responses from rig movement. Piston effect in a well, riser, such as the drilling fluid return flow line 125, or other component, in addition to swab or surge, can also be considered. Behavior of movement data can be identified and tied back in to a response from flow out measurements using machine-learning algorithms to predict normal behavior, and anomalies can be flagged.

An output of the compensation calculation block 808 can be provided to signal processing and calculations block 816. Also received by the signal processing and calculations block 816 may be rig data 818. The rig data 818 can include flow-in volume, bit depth, hole depth, stand pipe pressure, hookload, rotary RPM, rotary torque, density inputs, temperature inputs, or any other data associated with the rig.

The output of the signal processing and compensation calculation block 816 may undergo a data validity check process at block 820 before a flow rate is output at block 822. An actual flow rate determined from the process of FIGS. 7A and 7B may be logged at block 824. The actual flow rate logged at block 824 may be the calculated fluid flow rate.

By using certain examples of the present disclosure a predicted flow rate of drilling fluid for a given movement of an offshore drilling rig can be predicted and drilling fluid monitoring can be improved for controlling a drilling operation.

As used below, any reference to a series of examples is to be understood as a reference to each of those examples disjunctively (e.g., "Examples 1-4" is to be understood as "Examples 1, 2, 3, or 4").

Example 1 is a system comprising: a plurality of sensors positionable at different angles in a container of an offshore drilling rig to sense data about drilling fluid flow in the container; and a computing device communicatively couplable to the plurality of sensors for receiving the data about the drilling fluid flow in the container and using the data to determine a calculated fluid flow rate compensating for movement of the offshore drilling rig.

Example 2 is the system of example 1, wherein the plurality of sensors are positionable such that the plurality of sensors are spaced from one another by a distance equal to a diameter of the container.

Example 3 is the system of example 1, wherein the computing device includes a processing device and a non-transitory computer-readable medium with instructions that are executable by the processing device to perform operations comprising: cross-correlating data from each sensor of the plurality of sensors with data from at least one other sensor of the plurality of sensors to form cross-correlated data; using the cross-correlated data with riser management information, rig dynamic positioning information, and rig data to determine the calculated fluid flow rate; and outputting the calculated fluid flow rate for controlling a drilling operation.

Example 4 is the system of examples 1 and 3, wherein the calculated fluid flow rate corresponds to position measurements of drilling fluid within the container from the plurality of sensors.

Example 5 is the system of examples 1 and 3, wherein the operation of cross-correlating the data comprises performing at least one of Pearson correlation, time-lagged cross-correlation, dynamic time warping, or instantaneous phase synchrony.

Example 6 is the system of examples 1 and 3, wherein the operations further comprise: applying the data from each sensor of the plurality of sensors to at least one sounding table to estimate a volume of drilling fluid in the container, wherein the operation of cross-correlating the data from each sensor of the plurality of sensors comprises cross-correlating the estimated volume of the drilling fluid from each sensor of the plurality of sensors.

Example 7 is the system of example 1, wherein each sensor of the plurality of sensors is positionable at an angle between 30 degrees and 60 degrees with respect to an adjacent sensor of the plurality of sensors.

Example 8 is the system of example 1, wherein each sensor of the plurality of sensors comprises a distance sensor positionable to measure a distance of drilling fluid in the container from each sensor of the plurality of sensors.

Example 9 is a method comprising: receiving sensor data from a plurality of sensors indicating drilling fluid flow in a container, wherein the plurality of sensors are positionable at different angles in the container of an offshore drilling rig to generate the sensor data; cross-correlating the sensor data from each sensor of the plurality of sensors with the sensor data from at least one other sensor of the plurality of sensors to form cross-correlated data; receiving rig data of an offshore rig associated with the container; determining a calculated fluid flow rate using the cross-correlated data and the rig data; and outputting the calculated fluid flow rate for controlling a drilling operation.

Example 10 is the method of example 9, wherein the rig data comprises drilling fluid flow-in volume, bit depth, hole depth, stand pipe pressure, hookload, riser tension, riser movement, and riser weight.

Example 11 is the method of example 9, further comprising: applying the sensor data from each sensor of the plurality of sensors to at least one sounding table to estimate a volume of drilling fluid in the container, wherein cross-correlating the sensor data from each sensor of the plurality of sensors comprises cross-correlating the estimated volume of the drilling fluid from each sensor of the plurality of sensors.

Example 12 is the method of example 9, wherein the calculated fluid flow rate corresponds to position measurements of drilling fluid within the container from the plurality of sensors.

Example 13 is the method of example 9, wherein cross-correlating the sensor data comprises performing at least one of Pearson correlation, time-lagged cross-correlation, dynamic time warping, or instantaneous phase synchrony.

Example 14 is the method of example 9, wherein each sensor of the plurality of sensors is positioned at an angle between 30 degrees and 60 degrees with respect to an adjacent sensor of the plurality of sensors.

Example 15 is the method of example 9, wherein each sensor of the plurality of sensors comprises a distance sensor positionable to measure a distance of drilling fluid in the container from each sensor of the plurality of sensors.

Example 16 is a non-transitory computer-readable medium comprising instructions that are executable by a processing device for causing the processing device to perform operations comprising: receiving sensor data from a plurality of sensors about drilling fluid flow in a container, wherein the plurality of sensors are positionable at different angles in the container of an offshore drilling rig to sense data about drilling fluid flow in the container; cross-correlating data from each sensor of the plurality of sensors with data from at least one other sensor of the plurality of sensors to form cross-correlated data; using the cross-correlated data with riser management information, rig dynamic positioning information, and rig data to determine a calculated fluid flow rate; and outputting the calculated fluid flow rate for controlling a drilling operation.

Example 17 is the non-transitory computer-readable medium of example 16, wherein the calculated fluid flow rate corresponds to position measurements made by the plurality of sensors.

Example 18 is the non-transitory computer-readable medium of example 16, wherein the operation of cross-correlating the data comprises performing at least one of Pearson correlation, time-lagged cross-correlation, dynamic time warping, or instantaneous phase synchrony.

Example 19 is the non-transitory computer-readable medium of example 16, wherein each sensor of the plurality of sensors is positioned at an angle between 30 degrees and 60 degrees with respect to an adjacent sensor of the plurality of sensors.

Example 20 is the non-transitory computer-readable medium of example 16, wherein each sensor of the plurality of sensors comprises a distance sensor positionable to measure a distance of drilling fluid in the container from each sensor of the plurality of sensors.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a plurality of sensors positioned at different angles in a container of an offshore drilling rig to sense height data about drilling fluid flow in the container; and
a computing device communicatively couplable to the plurality of sensors, the computing device comprising a processing device and a non-transitory computer-readable medium with instructions that are executable by the processing device to perform operations comprising:
receiving the height data about the drilling fluid flow in the container from at least a subset of the plurality of sensors;
cross-correlating the height data from each sensor of the plurality of sensors with the height data from at least one other sensor of the plurality of sensors to generate cross-correlated height data, wherein cross-correlating the height data includes:
time-delaying first height data from a first sensor of the plurality of sensors to generate time-delayed first height data;
combining the time-delayed first height data with second height data from a second sensor of the plurality of sensors to generate first combined data;
time-delaying the first combined data to generate a first subset of the cross-correlated height data;
time-delaying the second height data to generate time-delayed second height data;
combining the time-delayed second height data with third height data from a third sensor of the plurality of sensors to generate second combined data; and
averaging the second combined data to generate a second subset of the cross-correlated height data; and
using the cross-correlated height data to determine a calculated fluid flow rate compensating for movement of the offshore drilling rig.

2. The system of claim 1, wherein the plurality of sensors are positioned such that the plurality of sensors are spaced from one another by a distance equal to a diameter of the container.

3. The system of claim 1, wherein the operations further comprise:
using the cross-correlated height data with riser management information, rig dynamic positioning information, and rig data to determine the calculated fluid flow rate; and
outputting the calculated fluid flow rate for controlling a drilling operation.

4. The system of claim 1, wherein the operation of cross-correlating the height data further comprises performing at least one of Pearson correlation, dynamic time warping, or instantaneous phase synchrony.

5. The system of claim 1, wherein the operations further comprise:
applying the height data from each sensor of the plurality of sensors to at least one sounding table to estimate a volume of drilling fluid in the container, wherein the operation of cross-correlating the height data from each sensor of the plurality of sensors comprises cross-correlating the estimated volume of the drilling fluid from each sensor of the plurality of sensors.

6. The system of claim 1, wherein each sensor of the plurality of sensors is positioned at an angle between 30 degrees and 60 degrees with respect to an adjacent sensor of the plurality of sensors.

7. The system of claim 1, wherein each sensor of the plurality of sensors comprises a distance sensor to measure a distance of drilling fluid in the container from each sensor of the plurality of sensors.

8. A method comprising:
receiving height data from a plurality of sensors indicating drilling fluid flow in a container, wherein the plurality of sensors are positioned at different angles in the container of an offshore drilling rig to generate the height data;
cross-correlating the height data from each sensor of the plurality of sensors with the height data from at least one other sensor of the plurality of sensors to form cross-correlated height data, wherein:
first height data from a first sensor of the plurality of sensors is time-delayed and combined with second height data from a second sensor of the plurality of sensors to generate first combined data that is time-delayed to generate a first subset of the cross-correlated height data, and
the second height data is time-delayed and combined with third height data from a third sensor of the plurality of sensors to generate second combined data that is averaged to generate a second subset of the cross-correlated height data;
receiving rig data of an offshore rig associated with the container;
determining a calculated fluid flow rate using the cross-correlated height data and the rig data; and
outputting the calculated fluid flow rate for controlling a drilling operation.

9. The method of claim 8, wherein the rig data comprises drilling fluid flow-in volume, bit depth, hole depth, stand pipe pressure, hookload, riser tension, riser movement, and riser weight.

10. The method of claim 8, further comprising:
applying the height data from each sensor of the plurality of sensors to at least one sounding table to estimate a volume of drilling fluid in the container, wherein cross-correlating the height data from each sensor of the plurality of sensors comprises cross-correlating the estimated volume of the drilling fluid from each sensor of the plurality of sensors.

11. The method of claim 8, wherein cross-correlating the height data further comprises performing at least one of Pearson correlation, dynamic time warping, or instantaneous phase synchrony.

12. The method of claim 8, wherein each sensor of the plurality of sensors is positioned at an angle between 30 degrees and 60 degrees with respect to an adjacent sensor of the plurality of sensors.

13. The method of claim 8, wherein each sensor of the plurality of sensors comprises a distance sensor positionable to measure a distance of drilling fluid in the container from each sensor of the plurality of sensors.

14. A non-transitory computer-readable medium comprising instructions that are executable by a processing device for causing the processing device to perform operations comprising:
receiving height data from a plurality of sensors about drilling fluid flow in a container, wherein the plurality of sensors are positioned at different angles in the container of an offshore drilling rig to sense data about drilling fluid flow in the container;
cross-correlating height data from each sensor of the plurality of sensors with height data from at least one other sensor of the plurality of sensors to form cross-correlated height data, wherein cross-correlating the height data includes:
time-delaying first height data from a first sensor of the plurality of sensors to generate time-delayed first height data;
combining the time-delayed first height data with second height data from a second sensor of the plurality of sensors to generate first combined data;
time-delaying the first combined data to generate a first subset of the cross-correlated height data;
time-delaying the second height data to generate time-delayed second height data;
combining the time-delayed second height data with third height data from a third sensor of the plurality of sensors to generate second combined data; and
averaging the second combined data to generate a second subset of the cross-correlated height data;
using the cross-correlated height data with riser management information, rig dynamic positioning information, and rig data to determine a calculated fluid flow rate; and
outputting the calculated fluid flow rate for controlling a drilling operation.

15. The non-transitory computer-readable medium of claim 14, wherein the operation of cross-correlating the height data further comprises performing at least one of Pearson correlation, dynamic time warping, or instantaneous phase synchrony.

16. The non-transitory computer-readable medium of claim 14, wherein each sensor of the plurality of sensors is positioned at an angle between 30 degrees and 60 degrees with respect to an adjacent sensor of the plurality of sensors.

17. The non-transitory computer-readable medium of claim 14, wherein each sensor of the plurality of sensors comprises a distance sensor positionable to measure a distance of drilling fluid in the container from each sensor of the plurality of sensors.

* * * * *